United States Patent [19]
Oda et al.

[11] Patent Number: 5,711,269
[45] Date of Patent: Jan. 27, 1998

[54] IN-CYLINDER INJECTION INTERNAL COMBUSTION ENGINE

[75] Inventors: Hideyuki Oda; Kenji Goto, both of Tokyo, Japan

[73] Assignee: Mitsubishi Jidosha Kogyo Kabushiki Kaisha, Tokyo, Japan

[21] Appl. No.: 750,161
[22] PCT Filed: Mar. 27, 1996
[86] PCT No.: PCT/JP96/00802
  § 371 Date: Nov. 27, 1996
  § 102(e) Date: Nov. 27, 1996
[87] PCT Pub. No.: WO96/30632
  PCT Pub. Date: Mar. 10, 1996

[30] Foreign Application Priority Data

Mar. 28, 1995 [JP] Japan ............... 7-069815

[51] Int. Cl.⁶ ............... F02B 19/08
[52] U.S. Cl. ............... 123/262
[58] Field of Search ............... 123/262, 260, 123/261, 263, 269, 274, 279, 275

[56] References Cited

U.S. PATENT DOCUMENTS

| | | | |
|---|---|---|---|
| 4,526,143 | 7/1985 | Oshima et al. | 123/262 |
| 4,693,218 | 9/1987 | Nagakura | 123/260 |
| 5,115,774 | 5/1992 | Nomura et al. | 123/276 |
| 5,305,720 | 4/1994 | Ando et al. | 123/193.4 |

FOREIGN PATENT DOCUMENTS

| | | | |
|---|---|---|---|
| 55-180028 | 12/1980 | Japan | 123/262 |
| 61-202631 | 12/1986 | Japan | 123/262 |
| 62-27222 | 3/1987 | Japan | 123/262 |
| 62-27247 | 6/1987 | Japan | 123/262 |
| 62-178717 | 8/1987 | Japan | 123/262 |
| 62-178718 | 8/1987 | Japan | 123/262 |
| 352333 | 5/1991 | Japan | 123/262 |
| 4-124426 | 4/1992 | Japan | 123/262 |
| 4-166612 | 6/1992 | Japan | 123/262 |
| 4-224231 | 8/1992 | Japan | 123/262 |
| 526047 | 2/1993 | Japan | 123/262 |
| 579337 | 3/1993 | Japan | 123/262 |
| 5-179957 | 7/1993 | Japan | 123/262 |
| 5-240044 | 9/1993 | Japan | 123/262 |
| 5-240045 | 9/1993 | Japan | 123/262 |
| 5-240047 | 9/1993 | Japan | 123/262 |
| A06146886 | 5/1994 | Japan | 123/262 |
| 1560430 | 2/1980 | United Kingdom | 123/262 |

*Primary Examiner*—Raymond A. Nelli

[57] ABSTRACT

This invention relates to an in-cylinder injection internal combustion engine. A recessed portion (22A) is arranged in a top wall of a piston (22) to promote formation of a vertical swirl so that a flow of inducted air introduced into a combustion chamber (27) of the engine is caused to advance from a lower wall (21A) of a cylinder head (21) of the engine toward the top wall of the piston (22) and then to advance backward from the top wall of the piston (22) toward the lower wall (21A) of the cylinder head (21). A corner of the recessed portion (22A) is formed blunter at an outlet side of the vertical swirl than at an inlet side of the vertical swirl. In the in-cylinder injection internal combustion engine in which fuel is injected directly into the combustion chamber (27), it is possible to achieve inter alia a high gas mileage by allowing a lean air-fuel mixture to undergo stratified combustion and also a high power output when a gas-fuel mixture richer than the lean air-fuel mixture is burnt. A high-efficiency internal combustion engine can hence be provided.

17 Claims, 12 Drawing Sheets

RESTORATION OF THE FULL THROTTLE CHARACTERISTICS BY EDGE ELIMINATION

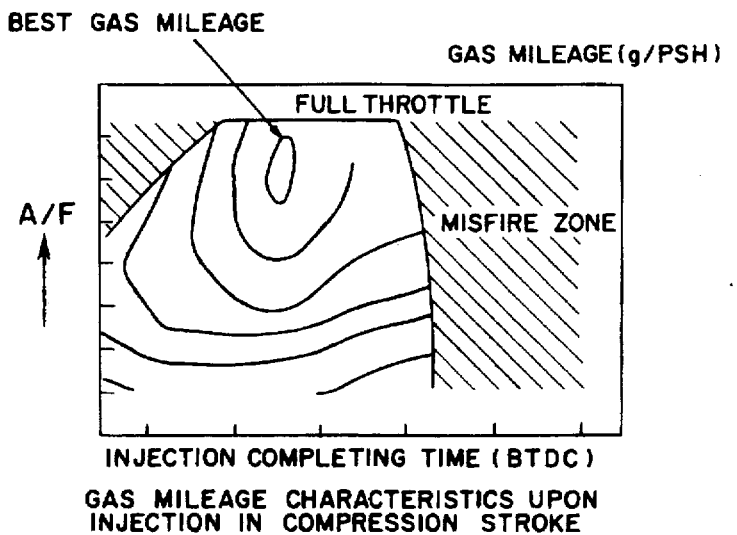
FIG. 13(A) PISTON (a)
GAS MILEAGE CHARACTERISTICS UPON INJECTION IN COMPRESSION STROKE
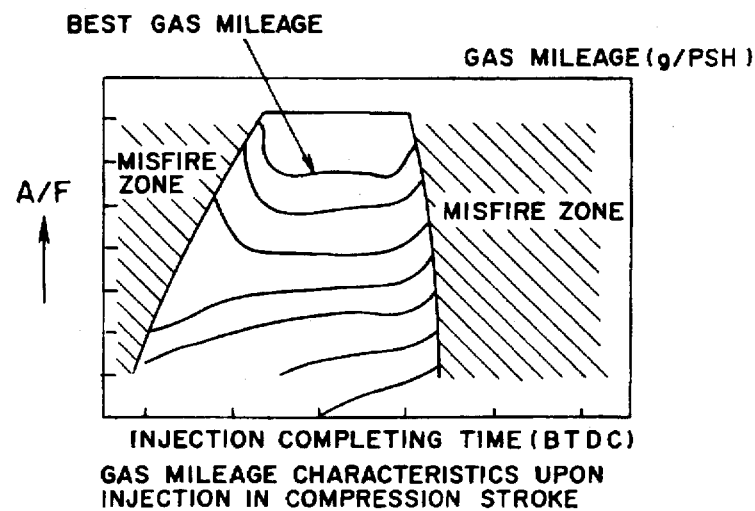
FIG. 13(B) PISTON (b)
GAS MILEAGE CHARACTERISTICS UPON INJECTION IN COMPRESSION STROKE
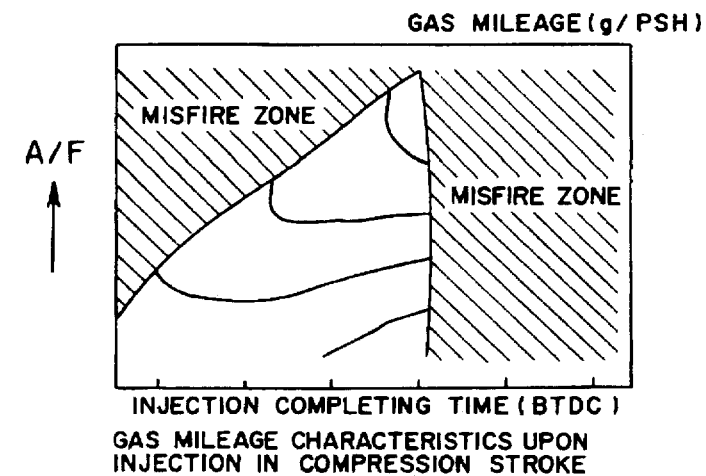
FIG. 13(C) PISTON (c)
GAS MILEAGE CHARACTERISTICS UPON INJECTION IN COMPRESSION STROKE 5,711,269

IN-CYLINDER INJECTION INTERNAL COMBUSTION ENGINE

TECHNICAL FIELD

This invention relates to an in-cylinder injection internal combustion engine in which fuel is injected directly into a combustion chamber, and especially to a combustion chamber construction of an internal combustion engine, the construction being designed to burn an air-fuel mixture, which is lean as a whole, in a stable state and also to improve a power output when an air-fuel mixture richer than the lean air-fuel mixture (for example, equivalent to a stoichiometric air/fuel ratio) is burnt.

BACKGROUND ART

As is known well, among internal combustion engines, a gasoline engine supplies from an injector into an intake port fuel in a quantity corresponding to a quantity of inducted air flowed into a cylinder during an intake stroke, whereby an air-fuel mixture is formed in a combustion chamber.

The air-fuel mixture so supplied to the combustion chamber is ignited by a spark plug in a latter stage of a compression stroke and is hence caused to burn so that combustion energy is produced. By way of a piston, a connecting rod and a crankshaft, this energy is converted into rotational energy to obtain a power output.

Among the internal combustion engines, a diesel engine which primarily uses kerosine or the like as fuel directly injects fuel in a quantity corresponding to a stroke of an accelerator pedal into highly-compressed air in a combustion engine through an injection valve arranged facing the combustion chamber so that the resulting atomized fuel is caused to burn by autoignition in the combustion chamber to produce combustion energy. Like the gasoline engine, this combustion energy is converted into rotational energy to obtain a power output.

In such gasoline engines as described above, there have been proposed gasoline engines of the type that a flow of inducted air, which has flowed into the combustion chamber, is formed into a stratified vertical swirl of fuel and air and lean burning is performed with an air-fuel mixture, which is leaner as a whole than a stoichiometric air-fuel ratio, so that the gas mileage of the engine is improved and the occurrence of exhaust gases such as NOx, HC and CO can be reduced.

To form a tumble flow as one of such vertical swirls, reference may be had, for example, to Japanese Patent Application Laid-Open (Kokai) No. HEI 5-240045.

According to the technique disclosed in the above publication, a construction is proposed to develop a flow of inducted air in such a way that a flow of inducted air is introduced through an intake port of a cylinder head of an engine in a direction as parallel as possible with a lower wall of the cylinder head, is downwardly introduced along an inner wall portion of a cylinder of a combustion chamber on a side of an exhaust valve, is reversed in direction by a recessed portion formed in a top wall of a piston sliding in the cylinder, and is then allowed to flow upwardly from the top wall of the piston along the inner wall of the cylinder on the side of an intake valve (this flow will hereinafter be called a "normal tumble flow").

Incidentally, as opposed to the normal tumble flow, there is a flow called a "reversed tumble flow". Namely, a flow of inducted air from the intake port is downwardly introduced along the inner wall of the cylinder on the side of the intake valve, is reversed in direction by the recessed portion formed in the top wall of the piston, and is then allowed to upwardly flow from the top wall of the piston along the inner wall of the cylinder on the side of the exhaust valve.

In such gasoline engines as described above, there have also been proposed in-cylinder injection internal combustion engines of the type that fuel is directly inducted into a combustion chamber to improve the gas mileage by lean burning.

However, to produce the normal tumble flow by using such a construction as disclosed in Japanese Patent Application Laid-Open (Kokai) No. HEI 5-240045, it is necessary to arrange the intake port in a direction as parallel as possible with the lower wall of the cylinder head. In an in-cylinder injection internal combustion engine, however, no sufficient space can be obtained for the arrangement of an injector.

On the other hand, as a construction of an inducted air guide passage which probably permits arrangement of an injector while making it possible to produce the above-mentioned reversed tumble flow, there is, for example, the technique disclosed in Japanese Patent Application Laid-Open (Kokai) No. HEI 4-166612.

As is illustrated in FIG. 14, according to the technique disclosed in this publication, a pair of in-take valves 6 are arranged in one side of inner wall portions of the cylinder head, a pair of exhaust valves 7 are disposed in the other side of inner wall portion of the cylinder head, and an intake port is also formed with one end opening through a side wall of a cylinder and an opposite end being connected to an intake opening in a somewhat vertical direction.

The construction according to the technique disclosed in the publication that the intake port which extends from the intake opening opens through the side wall of the cylinder cannot provide any sufficient space for the arrangement of an injector when the cooling performance for an injector main body 14 and that for fuel to be supplied by the injector are taken into consideration.

According to the technique disclosed in the publication, a recess 15 which extends from a point below a spark plug 10 to another point below a free end portion of the fuel injection valve 14 is formed in the top wall of the piston 2 as shown in FIG. 14 and FIG. 15.

This recess 15 is formed in the shape of a substantially spherical surface which is symmetrical relative to a vertical plane in which the spark plug 10 and the fuel injection valve 14 for the recess 15 are contained. In an inner wall of the recess 15 below the spark plug 10, a fuel guide groove 16 is formed extending in the form of an arc from a bottom portion of the recess 15 toward the spark plug 10.

As a consequence, fuel injected from the fuel injection valve 14 is allowed to strike the bottom portion of the recess 15 and is then guided to and around the spark plug 10 from the bottom portion of the recess 15 by the fuel guide groove 16. This makes it possible to form a rich air-fuel mixture around the spark plug 10, leading to an improvement in ignitionability.

As a further in-cylinder injection internal combustion engine, there has also been proposed such an in-cylinder injection internal combustion engine that, as depicted in FIG. 16 and FIG. 17, a top wall b of a piston a is provided with a recessed portion c, for example, in the form of a spherical segment to burn a stratified tumble flow of a rich air-fuel mixture and a superlean air-fuel mixture so that lean burning can be performed at an air-fuel ratio which is lean as a whole.

To assure sufficient ignitionability during lean burning, it has also been known, for example, to form the recess 15 and the fuel guide groove 16 for the guidance of an air-fuel mixture to and around the spark plug as shown in FIG. 14 and FIG. 15 or to form the recessed portion c in the form of the spherical segment for the formation of a tumble flow of a rich air-fuel mixture in the vicinity of the spark plug as illustrated in FIG. 16 and FIG. 17.

However, the formation of the recess 15 and fuel guide groove 16 or the recessed portion c in the top wall of the piston as shown in FIG. 14 and FIG. 15 or in FIG. 16 and FIG. 17 results in the formation of an edge along the peripheral edge of the opening.

Incidentally, as is disclosed, for example, in Japanese Patent Application Laid-Open (Kokai) No. HEI 6-146886, there has been known a technique that, for example, fuel is injected in a later stage of a compression stroke to have an air-fuel mixture concentrated around a spark plug in a low-load and low-speed rotation range but fuel is injected from an earlier stage of an intake stroke to form a uniform air-fuel mixture in a combustion chamber in a high-load and high-speed rotation range.

Through research by the inventors of the present invention, the recess required in the top wall of the piston was however found to involve the following problems in forming a stratified tumble flow and assuring sufficient ignitionability during lean burning by injecting fuel near the spark plug in a later stage of a compression stroke to form a tumble flow of a rich air-fuel mixture around the spark plug and a tumble flow of a superlean air-fuel mixture in a region remote from the spark plug.

This will be explained using FIG. 16 and FIG. 17 which have been referred to in the above. To assure sufficient ignitionability during lean burning making use of stratified tumble flows, it is required to form the recessed portion c in the top wall of the piston and also such a sharp edge d as indicated by a solid circle along the peripheral edge of the opening where an inner wall of the recessed portion c in the shape of the peripheral segment and the top wall of the piston meet with each other.

When fuel is injected in a later stage of a compression stroke in the low-load and low-speed rotation range, this edge d can facilitate separation of the reversed tumble flow from the recessed portion c upon its departure from the inner wall of the recessed portion c into the combustion chamber so that the reversed tumble flow is retained as intact as possible and stratified combustion by the stratified tumble flows can be stabilized.

In a high-load range or a high-speed rotation range, on the other hand, fuel is injected from an in-take stroke to an earlier stage of a compression stroke so that an air-fuel mixture (for example, equivalent to a stoichiometric air-fuel ratio) richer than that used at the time of lean burning is uniformly formed in the combustion chamber to produce a high power output.

In this case, the top wall of the piston is provided with a greater surface area owing to the existence of the recessed portion c. Further, it has also been found that the edge d of the peripheral edge of the opening becomes very hot over the entire periphery thereof, leading to a large heat loss and hence to an output loss.

It may hence be contemplated to cut off the edge d along the entire periphery of the recessed portion c, the edge becoming particularly hot, so that a rounded portion f is formed on and along the entire periphery of the edge d, for example, as shown by a two-dot chain circle around the recessed portion c in FIG. 16 and FIG. 17 to avoid a heat loss at the top wall of the piston even when an air-fuel mixture richer than that used at the time of lean burning is caused to burn.

As a consequence, the rounded portion f becomes lower in height than the edge d as shown in FIG. 16 so that the surface area of the piston is reduced at the same time. The above-described heat loss can therefore be reduced and the power output of the engine can be improved. In this case, it has however been found that upon stratified combustion in the low-load and low-speed rotation range, the reversed tumble flow, namely, the compressed fluid in the recessed portion c is allowed to leak out of the recessed portion c because of the formation of the rounded portion f on and along the entire peripheral edge of the recessed portion c, thereby inhibiting the maintenance of the reversed tumble flow and failing to stabilize the lean burning.

With the foregoing problems in view, the present invention has as an object the provision of a high-efficiency in-cylinder injection internal combustion engine that a recessed portion is formed in a top wall of a piston to direct a flow of inducted air introduced into a combustion chamber of the engine from a lower wall of a cylinder head toward the top wall of the piston and then from the top wall of the piston back toward the lower wall of the cylinder head, namely, to promote formation of a vertical swirl and that the recessed portion is formed blunter at a corner portion thereof on an inlet side of the vertical swirl than at a corner portion thereof on an outlet side of the vertical swirl to form a strong vertical swirl in the combustion chamber and the engine can hence be stably operated even during lean burning of stratified tumble flows each composed of a rich air-fuel mixture and a superlean air-fuel mixture to achieve an improvement in gas mileage and the heat loss is also reduced to achieve an increase in power output even when an air-fuel mixture (for example, equivalent to a stoichiometric air/fuel ratio) richer than that used at the time of lean burning is caused to burn.

DISCLOSURE OF THE INVENTION

This invention is provided with a combustion chamber formed by a lower wall of a cylinder head and a top wall of a piston fittedly inserted within a cylinder, an intake valve arranged in the lower wall of the cylinder head of a combustion chamber, an exhaust valve arranged in the lower wall of the cylinder head of the combustion chamber, an intake port communicating at a lower end thereof to the combustion chamber through the intake valve so that a longitudinal swirl of inducted air is formed within the combustion chamber, an exhaust port communicating at a lower end thereof to the combustion chamber through the exhaust valve so that combustion gas in the combustion chamber is exhausted, a spark plug arranged on the cylinder head lower wall of the combustion chamber, and fuel injection means for directly injecting fuel into the combustion chamber; and is characterized in that the piston has a recessed portion arranged in the top wall of the piston to promote the formation of the longitudinal swirl with inducted air introduced into the combustion chamber through the intake valve and that a peripheral edge of the recessed portion is formed blunter at a corner portion on an inlet side of the vertical swirl than at another corner portion on an outlet side of the vertical swirl.

Owing to this construction, a flow of inducted air flows into the combustion chamber from each intake port through its intake opening in an intake stroke of the internal combustion engine.

Then, fuel is injected at an appropriate timing by the fuel injection means with an injection nozzle thereof arranged facing the combustion chamber and is mixed with air inducted corresponding to the timing of injection, whereby a stratified air-fuel mixture or a homogeneous air-fuel mixture is formed.

The vertical swirl, which has flowed in from an upper part of the combustion chamber toward its lower part, advances onto an inner wall of the recessed portion from the inlet side of the peripheral edge of the recess, flows along a bowed surface on the inner wall of the recessed portion, is effectively separated by the outlet-side corner portion of the peripheral edge of the recessed portion, and is converted into a vertical swirl directed toward an upper part of the combustion chamber. It is therefore possible to obtain a high-efficiency internal combustion engine that causes the air-fuel mixture to undergo stratified burning in a stabilized state to achieve an improvement in gas mileage and, even when operated with an air-fuel mixture richer than that employed at the time of lean burning, can reduce the heat loss on the top wall of the piston and can achieve an improvement in power output.

The peripheral edge of the recessed portion may be formed, at the inlet side of the vertical swirl, as such an oblique portion that the corner portion formed by the top wall of the piston and an inner wall of the recessed portion may be inclined from the top wall of the piston toward the recessed portion.

Further, the oblique portion can be formed in a shape gently rounded from a side of the top wall of the piston toward a side of the inner wall of the recessed portion.

As an alternative, the oblique portion can be formed as an oblique surface linearly inclined from a side of the top wall of the piston toward a side of the inner wall of the recessed portion.

Owing to these constructions, during low-load and low-speed rotation, the vertical swirl is effectively separated by the outlet-side corner portion of the recessed portion to permit lean burning by stratified combustion, and during high-load operation or high-speed rotation, a heat loss is reduced to achieve an improvement in power output by an oblique portion such as the gently rounded or linear oblique surface on the outlet side of the recessed portion.

Further, the oblique portion can be formed so that the inlet-side peripheral edge of the recessed portion can extend, at opposite end portions thereof in a direction of an axis of a crankshaft of the internal combustion engine, toward the outlet side of the vertical swirl.

In this construction, the opposite end portions of the oblique portion are formed extending toward the outlet side of the vertical swirl. Accordingly, the surface area can be reduced as much as possible so that in a high-load range or high-speed rotation range, a heat loss is reduced to achieve an improvement in power output. At the same time, in a low-load and low-rotation range, the air-fuel mixture can be effectively separated by the outlet-side corner portion of the peripheral edge of the recessed portion to allow the air-fuel mixture to undergo stratified combustion, thereby achieving an improvement in gas mileage.

The oblique portion can be formed so that the oblique portion can be gradually reduced in size from an inlet-side central part of the peripheral edge of the recessed portion toward the opposite end portions.

In this construction, the gradually size-reduced portions are formed so that the size of the oblique portion becomes gradually smaller from the inlet side of the vertical swirl toward the outlet side of the vertical swirl. It is therefore possible to substantially reduce a heat point area which may occur at the corner portion of the peripheral edge of the recessed portion. A heat loss can be reduced to achieve an improvement in power output.

Further, the peripheral edge of the recessed portion can be formed on the outlet side of the vertical swirl so that the corner portion formed by the top wall of the piston and an inner wall of the recessed portion can be in the form of an edge portion.

In this construction, the recessed portion is formed in the shape of the edge portion on the outlet side of the vertical swirl. Separating action can therefore be assured for the vertical swirl, thereby making it possible to obtain stable lean burning by stratified combustion.

The outlet-side corner portion of the recessed portion can be formed as an angular edge portion.

In this construction, the recessed portion is formed in the shape of the angular edge portion on the outlet side of the vertical swirl. Separating action can therefore be assured for the vertical swirl, thereby making it possible to obtain stable lean burning by stratified combustion.

In addition, the peripheral edge of the recessed portion can be formed, on the outlet side of the vertical swirl, substantially in parallel with an imaginary plane in which an axis of a crankshaft and an axis of the cylinder of the internal combustion engine are contained.

In this construction, the recessed portion is formed, on the outlet side of the vertical swirl, substantially in parallel with the imaginary plane and in the shape of the edge portion. Separating action can therefore be assured for the vertical swirl and the vertical swirl is prevented from leaking toward an exhaust side, thereby making it possible to obtain stable lean burning by stratified combustion.

Moreover, the intake valve can be arranged on one side of the combustion chamber, and the recessed portion can be arranged deviated from a center of the top wall of the piston toward the one side so that the recessed portion can be located facing at least the in-take valve.

Owing to this construction, the vertical swirl which has flowed in from an upper part of the combustion chamber toward its lower part is allowed to easily enter from the top wall of the piston and the inlet side of the recessed portion, to flow along a bowed surface on the inner wall of the recessed portion, to reverse its direction, and to be effectively separated by the corner portion on the outlet side of the peripheral edge of the recessed portion into a vertical swirl whose direction has been changed toward an upper part of the combustion chamber. It is therefore possible to allow the air-fuel mixture to undergo stratified combustion in a stable state, thereby achieving an improvement in gas mileage.

The recessed portion can be formed so that a cross-sectional shape taken in a flowing direction of the vertical swirl can be in the shape of an arc of circle.

Owing to the above construction, the vertical swirl which has flowed in from an upper part of the combustion chamber toward its lower part can undergo smooth reversal in direction along an inner peripheral surface of the recessed portion in the shape of the arc of circle. By the outlet-side corner portion of the peripheral edge of the recessed portion, the vertical swirl can therefore be effectively separated into a vertical swirl whose direction has been changed toward an upper part of the combustion chamber, whereby the air-fuel mixture can be allowed to undergo stratified combustion in a stable state to achieve an improvement in gas mileage.

As an alternative, the recessed portion can be formed in the shape of a spherical surface.

owing to the above construction, the vertical swirl which has flowed in from an upper part of the combustion chamber toward its lower part can undergo smooth reversal in direction along an inner peripheral surface of the recessed portion in the shape of the spherical surface. By the outlet-side corner portion of the peripheral edge of the recessed portion, the vertical swirl can therefore be effectively separated into a vertical swirl whose direction has been changed toward an upper part of the combustion chamber, whereby the air-fuel mixture is allowed to undergo stratified combustion in a stable state to achieve an improvement in gas mileage.

Further, the cylinder head lower wall can be formed in the shape of a pentroof composed of an intake-valve-side, tilted lower wall formed on the one side and an exhaust-valve-side, tilted lower wall formed on the opposite side, and the top wall of the piston can be formed in the shape of the pentroof having an intake-valve-side, tilted top wall and an exhaust-valve-side, tiled top wall formed corresponding to the intake-valve-side, tilted lower wall and the exhaust-valve-side, tilted lower wall, respectively.

Owing to the above construction, the vertical swirl which has flowed in from an upper part of the combustion chamber toward its lower part is guided by the inlet-side oblique portion of the peripheral edge of the recessed portion, advances onto the inner wall of the recessed portion, flows along a bowed surface of the inner wall of the recessed portion, and is effectively separated by the outlet-side corner portion of the peripheral edge of the recessed portion into a vertical swirl whose direction has been changed toward an upper part of the combustion chamber. By the pentroof shapes, the vertical swirl is allowed to undergo stratified combustion in a stable state, thereby achieving an improvement in gas mileage.

Further, the recessed portion can be formed in the intake-valve-side, tilted top wall, and the recessed portion can also be formed higher on the outlet side of the vertical swirl than on the inlet side of the vertical swirl.

Owing to the above construction, the vertical swirl which has flowed in from an upper part of the combustion chamber toward its lower part is effectively allowed to enter the recessed portion at the inlet side thereof, to reverse its direction and to form a vertical swirl whose direction has been changed toward an upper part of the combustion chamber. The vertical swirl is allowed to undergo stratified combustion in a stable state, thereby achieving an improvement in gas mileage.

As an alternative, the recessed portion can be formed extending over the intake-valve-side, tilted top wall and the exhaust-valve-side, tilted top wall.

Owing to the above construction, the vertical swirl which has flowed in from an upper part of the combustion chamber toward its lower part is guided by the inlet-side oblique portion of the peripheral edge of the recessed portion, advances onto the inner wall of the recessed portion, flows along a bowed surface of the inner wall of the recessed portion, and is effectively separated by the outlet-side corner portion of the peripheral edge of the recessed portion into a vertical swirl whose direction has been changed toward an upper part of the combustion chamber. The vertical swirl is therefore allowed to undergo stratified combustion in a stable state, thereby achieving an improvement in gas mileage.

Further, the corner portion formed by the top wall of the piston and an inner wall of the recessed portion can be formed in the shape of an edge portion as the peripheral edge of the recessed portion at the outlet side of the vertical swirl.

In the above construction, the recessed portion is formed in the shape of the angular edge portion on the outlet side of the vertical swirl. Separating action can therefore be assured for the vertical swirl, thereby making it possible to obtain stable stratified combustion by stratified combustion.

Moreover, the intake port can be arranged on one side of the imaginary plane and can be formed to extend vertically alongside the imaginary plane through the cylinder head.

Owing to the above construction, a flow of inducted air which has been introduced from the intake port into the combustion chamber flows in downwardly alongside a cylinder axis and is then reversed by the recessed portion in the top wall of the piston, thereby making it possible to form a vertical swirl flowing upwardly alongside the cylinder axis. The vertical swirl is therefore allowed to undergo stratified combustion in a stable state, thereby achieving an improvement in gas mileage.

BRIEF DESCRIPTION OF THE DRAWINGS

FIG. 13(A) shows gas mileage characteristics upon injection in compression strokes and illustrates test results of the piston (a).

FIG. 13(B) shows gas mileage characteristics upon injection in compression strokes and illustrates test results of the piston (b).

FIG. 13(C) shows gas mileage characteristics upon injection in compression strokes and illustrates test results of the piston (c).

BEST MODE FOR CARRYING OUT THE INVENTION

Embodiments of the present invention will hereinafter be described.

Referring first to FIG. 1 through FIG. 8, a description will be made about the in-cylinder injection internal combustion engine according to the first embodiment of the present invention.

Figure 1:
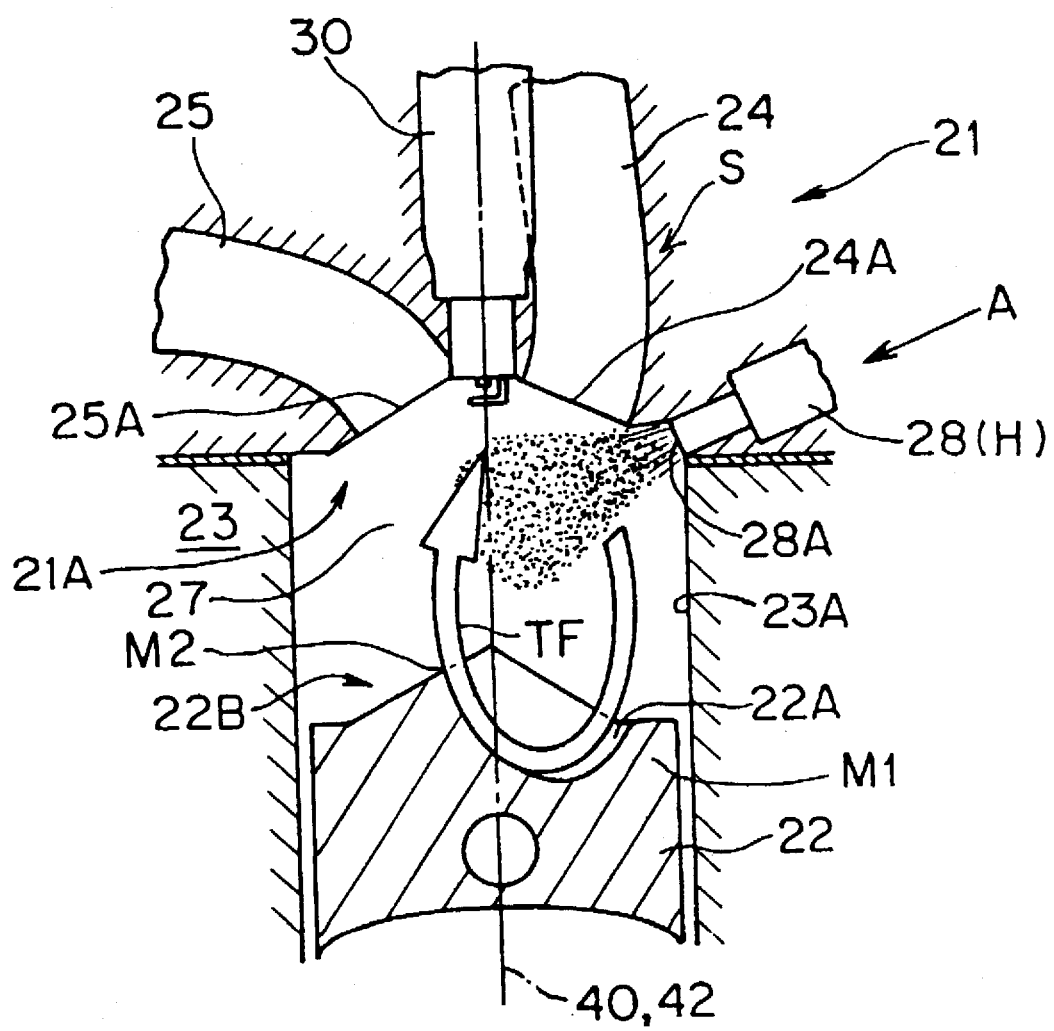
FIG. 1 is a vertical cross-sectional view schematically illustrating an interior of an in-cylinder injection internal combustion engine according to a first embodiment of the present invention.

As is illustrated in FIG. 1, in the construction of a combustion chamber of this in-cylinder injection internal combustion engine, an engine main body is composed of a cylinder head 21 and a cylinder block 23, and a piston 22 is fittedly inserted within a cylinder 23A of the cylinder block 23.

The cylinder head 21 of the internal combustion engine is constructed as a 4-valve internal combustion engine in which each cylinder is provided at one side of a lower wall thereof with two intake valves and at an opposite side of the same wall with two exhaust valves.

Between a top wall of the piston 22 and the lower wall 21A of the cylinder head 21, the combustion chamber 27 is formed.

Through the lower wall 21A of the cylinder head, an intake port 24 and an exhaust port 25 are connected in communication with the combustion chamber 27 via an intake opening 24A and an exhaust opening 25A, respectively.

In the intake and exhaust openings 24A, 25A of these intake port 24 and exhaust port 25, unillustrated intake and exhaust valves are arranged, respectively, so that the intake and exhaust openings 24A, 25A are opened or closed by these intake and exhaust valves.

Figure 2:
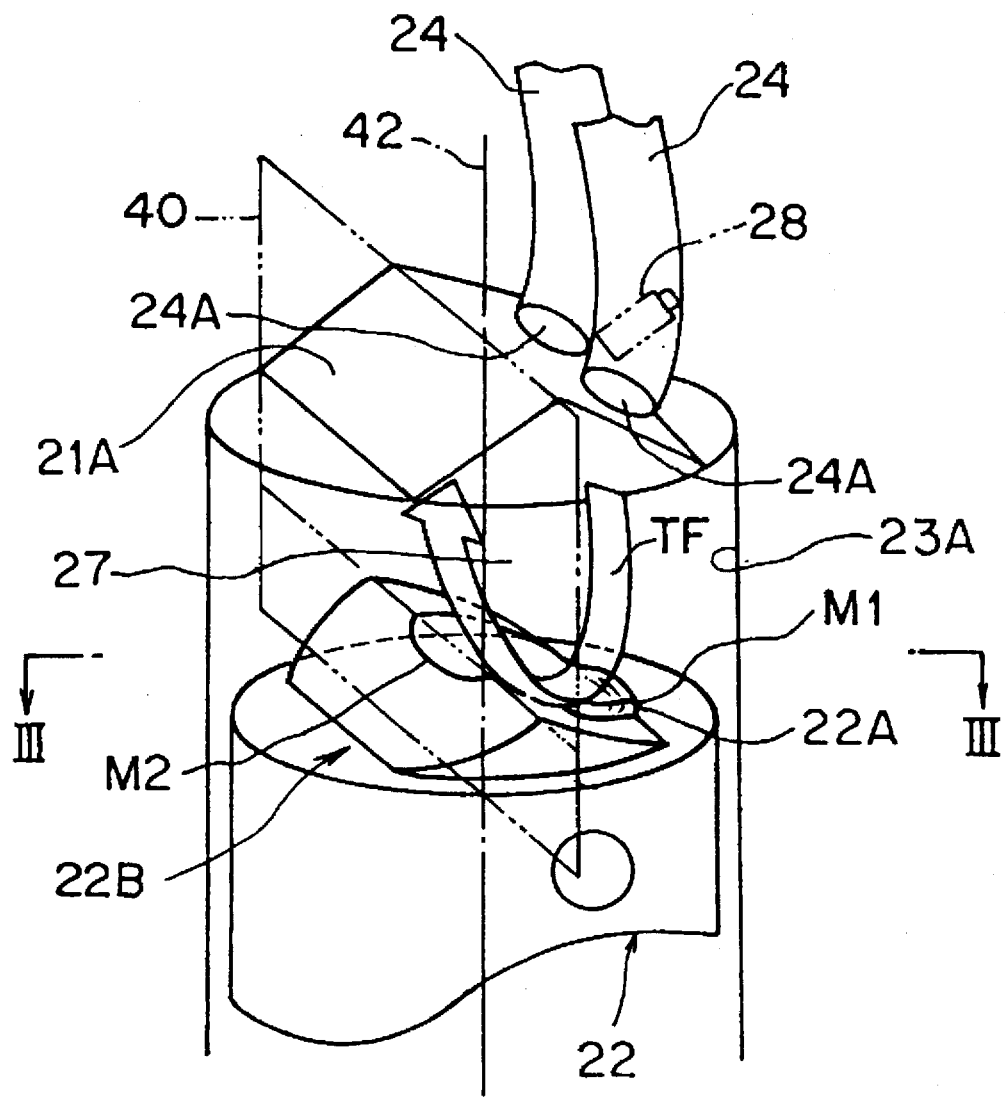
FIG. 2 is a schematic perspective view showing the overall construction of the interior of the in-cylinder injection internal combustion engine according to the first embodiment of the present invention.
Figure 4:
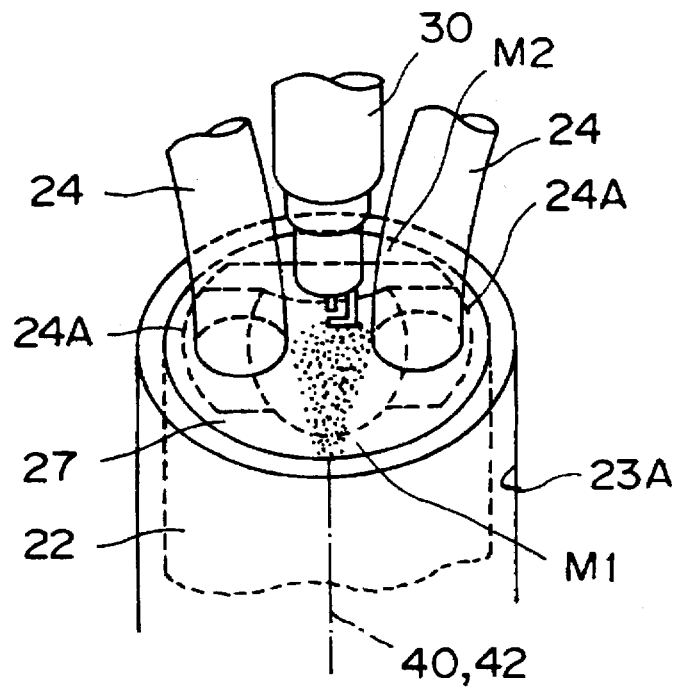
FIG. 4 is a view of the in-cylinder injection internal combustion engine according to the first embodiment of the present invention as viewed in the direction of arrow A of FIG. 1.

This combustion chamber 27 is formed as shown in FIG. 1, FIG. 2 and FIG. 4. Centering around such an imaginary plane 40 as containing a central axis 42 of the cylinder 24A and an axis of an unillustrated crankshaft, the lower wall 21A of the cylinder head is formed in the shape of a pentroof consisting of an intake-valve-side, tilted, lower wall formed on one side of the imaginary plane 40 and an exhaust-valve-side, tilted, lower wall formed on an opposite side of the imaginary plane 40. Further, the top wall of the piston 22 is formed in the shape of a pentroof having an intake-valve-side, titled, top wall formed on the one side of the imaginary plane 40 and an exhaust-valve-side, tilted, top wall formed on the opposite side of the imaginary plane 40 so that they correspond to the intake-valve-side, tilted, lower wall and the exhaust-valve-side, tilted, lower wall, respectively.

In the cylinder head 21, the two intake ports 24 are arranged on the one side of the imaginary plane 40 whereas the two exhaust ports 25 are disposed on the opposite side of the imaginary plane 40.

Further, as is depicted in FIG. 1 and FIG. 4, a spark plug 30 is arranged centrally in a top part of the combustion chamber 27, namely, in or near the imaginary plane 40.

The two intake ports 24 are arranged extending substantially upright in the cylinder head 21, and the intake openings 24A of the intake ports 24 are disposed so that they downwardly face in the vicinity of the imaginary plane 40.

For supplying fuel into the combustion chamber 27, an injector 28 as a fuel injection means H is arranged in a side wall of the cylinder head 21 on a side of the intake ports 24.

This injector 28 is arranged so that an injection nozzle 28A formed at a free end thereof faces the combustion chamber 27 through the side wall of the cylinder head 21, whereby fuel is injected directly into the combustion chamber 27.

The injector 28 is designed to be controlled, for example, by an unillustrated controller so that fuel is injected in a predetermined quantity at a predetermined injection timing.

As will be described in detail subsequently herein, the controller performs the control so that at least in a low-load and low-rotation range, fuel is injected in a later stage of a compression stroke to form a reversed tumble flow of a rich air-fuel mixture around the spark plug but in a high-load range and in a high-rotation range, fuel is injected from an early stage of an intake stroke to form a uniform air-fuel mixture in the combustion chamber.

Now describing about a mounting portion for the injector 28, the two intake ports 24 are arranged extending substantially upright from the cylinder head 21 as described above so that a sufficient space can be retained around the openings 24A of the intake ports 24 for mounting the injector 28.

The arrangement of the spark plug 30 in or around the imaginary plane 40 has also brought about substantial freedom for setting the position of arrangement of the injector 28, thereby making it possible to arrange the injector 28 at a position optimal for the injection of fuel.

Although not illustrated in any drawing, it is possible to effectively cool fuel, which is to be injected into the injector 28 and the combustion chamber 27, by arranging a coolant passage around the injector 28 mounted in the cylinder head.

As has been described above, the piston 22 is fittedly inserted within the cylinder 23A. As is shown in FIG. 1 and FIG. 2, this piston 22 defines a recessed portion 22A formed in a pentroof-shaped raised portion 22B which is composed of the intake-valve-side, tilted, top wall and the exhaust-valve-side, tilted, top wall on a top portion of the piston.

This recessed portion 22A is arranged in the top portion of the piston 22 at a part thereof located underneath the intake openings 24A, and is formed by a downwardly convex, curved surface so that the tilted walls of the raised portion 22B are cut off downwardly.

Namely, this recessed portion 22A is arranged at a position off-centered from the imaginary plane 40 toward the side of the intake openings 24A and, as shown by way of example in FIG. 2, is formed in a spherical shape which is curved in a downwardly convex form.

Figure 5:
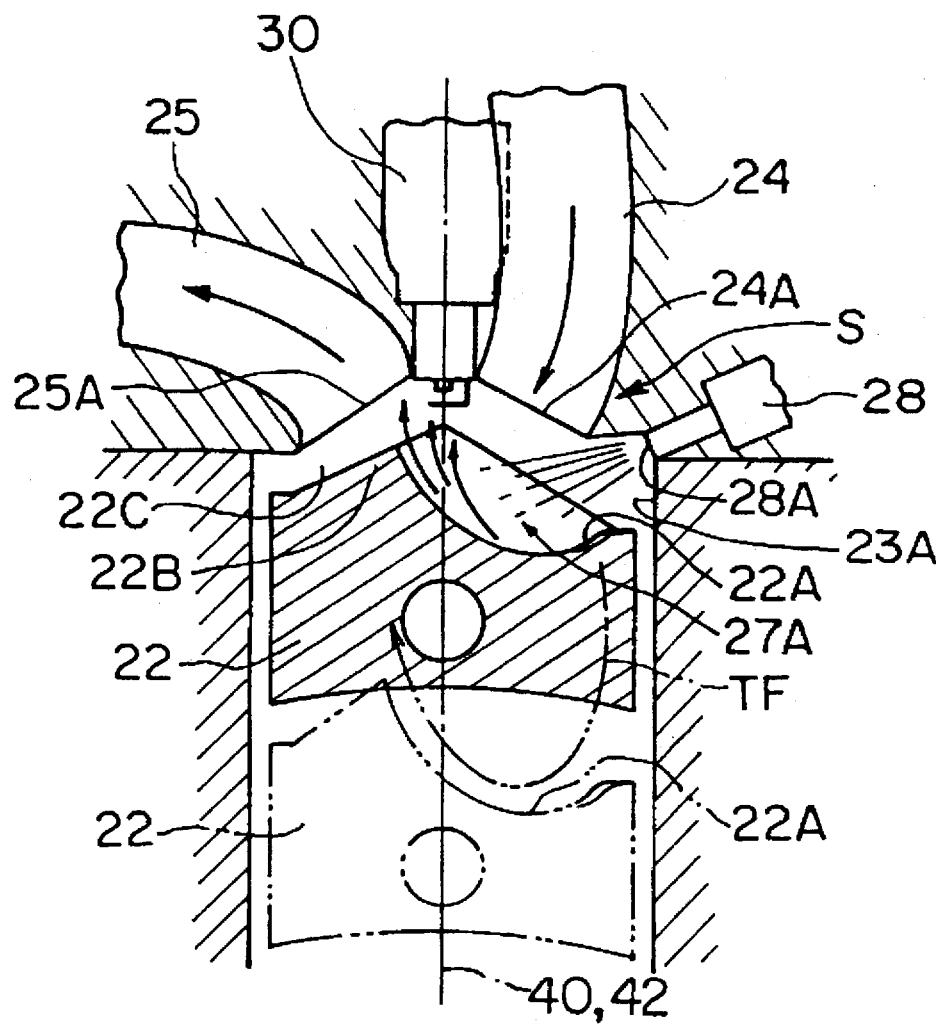
FIG. 5 is an illustration showing inducting action of FIG. 1 in the in-cylinder injection internal combustion engine according to the first embodiment of the present invention.

As a consequence, when the piston 22 has reached the end of a compression stroke, a compact combustion chamber 27A is defined in a form surrounded by the recessed portion 22A of the piston 22, an inner wall of the cylinder 23A and the lower wall of the cylinder head 21 as illustrated in FIG. 5.

Figure 3:
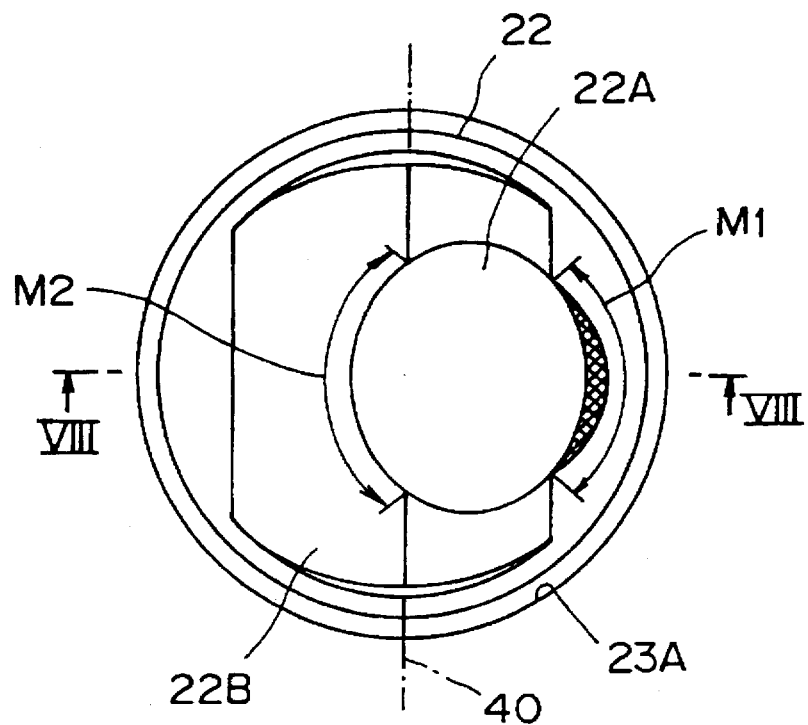
FIG. 3 is a transverse cross-sectional view showing a cross-section of the in-cylinder injection internal combustion engine according to the first embodiment of the present invention as taken by a plane extending along a line III—III of FIG. 2.

As shown in FIG. 1 to FIG. 3, an outlet side of a peripheral edge of the recessed portion 22A for a vertical swirl is formed as a tilted portion in a gently rounded portion M1 in a range indicated by an arrow, and a corner portion at which the tilted wall of the raised portion 22B on the side of the exhaust openings 25A and the inner wall of the recessed portion 22A meet each other, said corner portion serving as an outlet side of the peripheral edge of the recessed portion for the vertical swirl, is formed in an angular edge portion M2 in a range indicated by an arrow.

The corner portion of the recessed portion 22A on the inlet side for the vertical swirl is therefore formed blunter than the corner portion on the outlet side for the vertical swirl.

Further, as is illustrated in FIG. 5, a squishing area 22C is formed between the raised portion 22B of the top wall of the piston 22 and the side of the exhaust openings 25A above the combustion chamber 27.

As a consequence, as is shown in FIG. 1, FIG. 2 and FIG. 5, a flow of inducted air which has flowed in through the intake ports 24 flows toward the piston 22 located in a lower part of the inside of the cylinder 23A. The flow of inducted air advances into the recessed portion 22A of the piston 22 from the side of the rounded portion M1 on the inlet side for the vertical swirl and then is guided along the inner wall of the recessed portion 22A. By the angular edge portion M2 on the outlet side for the vertical swirl, the vertical swirl is then effectively separated and is allowed to flow upwards, so that a reversed tumble flow TF which is a vertical swirl is formed.

In the combustion chamber 27, the flow of inducted air therefore promotes the formation of the reversed tumble flow TF along the recessed portion 22A.

The injector 28 is controlled by an unillustrated controller so that fuel is injected in a predetermined quantity at a predetermined timing.

Figure 6:
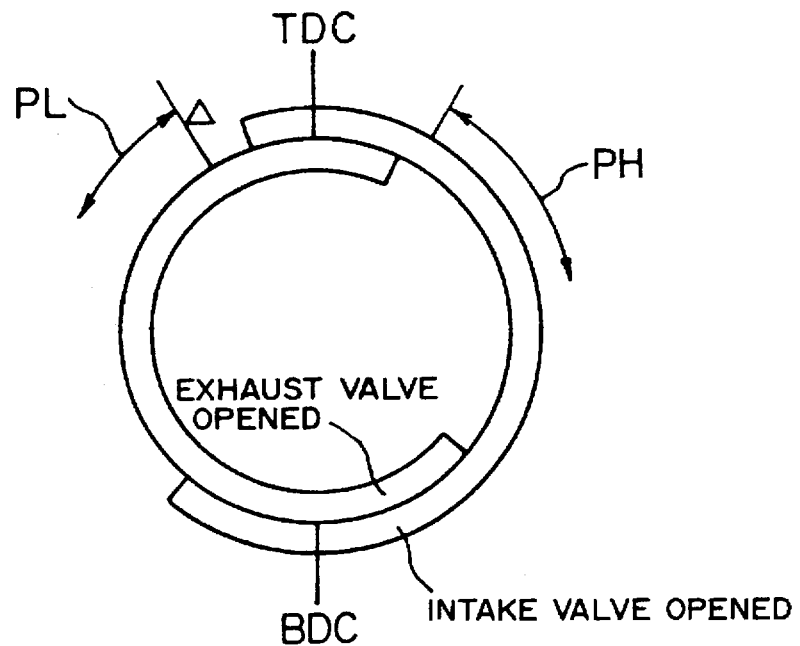
FIG. 6 is an illustration showing a drive cycle of the 4-cycle engine in the in-cylinder injection internal combustion engine according to the first embodiment of the present invention.

In such an internal combustion engine, for example, in the case of a 4-cycle engine, an intake valve is opened before TDC (an abbreviation of Top Dead Center), that is, 0° and upon entrance to an intake stroke, an exhaust valve is closed past TDC, i.e., 0° to complete the exhaust stroke of the preceding cycle, as shown in FIG. 6. The piston 22 thereafter descends up to 180° in terms of crank angle, during which the reversed tumble flow TF is formed as shown in FIG. 1 and FIG. 5. Into this reversed tumble flow TF, fuel is injected from the injector 28 at a predetermined injection timing such as in an intake stroke or in a later stage of a compression stroke.

When a predetermined ignition time before TDC, i.e., 360° is then reached, an unillustrated ignition circuit is driven to initiate an ignition processing (shown by a Δ mark in FIG. 6) by the spark plug 30. By this ignition processing, injected fuel is ignited to burn so that the in-cylinder pressure of the combustion chamber 27 arises. The piston 22 is therefore pushed down to produce an output, and a combustion stroke is performed until close to 540° in terms of crank angle, that is, BDC (an abbreviation of Bottom Dead Center).

Near a crank angle of 480°, the exhaust valve is opened and an exhaust stroke is continued until the crank angle exceeds 720°, whereby an opening operation of the intake valve for the next intake stroke is performed to complete the 4 cycles.

The injection timing for the injector 28 of the 4-cycle engine is controlled so that, in one example shown in FIG. 6, the injector is driven to perform injection at a predetermined injection time PH in an early stage of an intake stroke when the engine is in a high-load range or in a high-speed rotation range but is driven to perform injection at a predetermined injection time PL in a later stage of the compression stroke when the engine is in a low-load low-speed rotation range.

Here, it is possible to promote homogenization of fuel mixing and hence to ensure realization of smooth and prompt burning in a high-load range and at the time of high rotation by starting mixing of fuel with air in the form of the reversed tumble flow TF at an early stage and also enhancing agitation of an air-fuel mixture as a result of breakage of the tumble flow in the later stage of the compression stroke.

At the time of low-load and low-speed rotation, on the other hand, the injection of fuel is delayed, for example, to a later stage of the compression stroke to await the formation of the compact combustion chamber 27A. Here, an injection of fuel is performed toward the recessed portion 22A so that the fuel is guided to and around the spark plug 30. A reversed tumble flow of a rich air-fuel mixture is therefore formed around the spark plug 30, thereby making it possible to sufficiently assure stable ignition owing to stratified combustion.

The description has been made about the 4-cycle engine. The present invention may also be applied to a 2-cycle gasoline engine instead of the 4-cycle engine.

In this case, as the construction of a main body of the engine, a construction similar to that described above can be employed.

Figure 7:
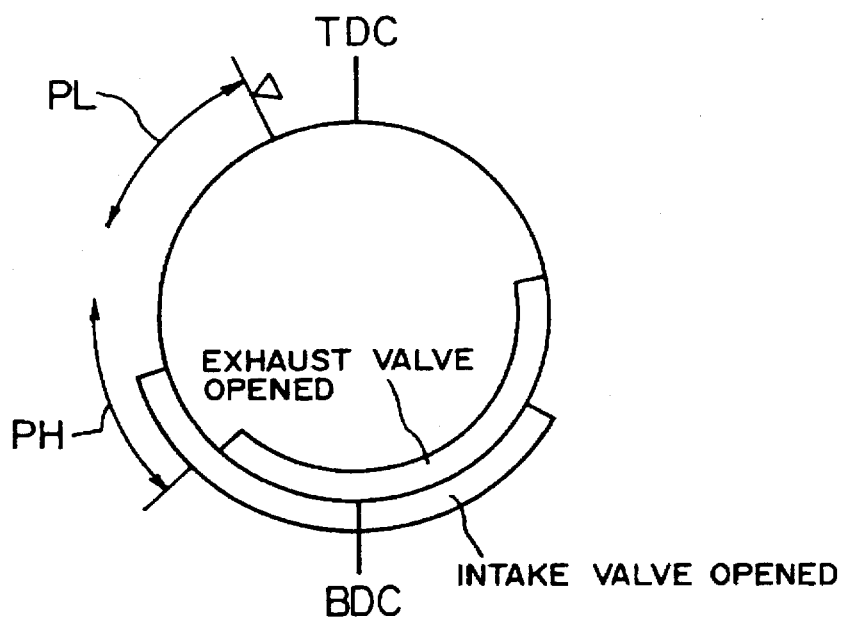
FIG. 7 is an illustration showing a drive cycle when the in-cylinder injection internal combustion engine according to the first embodiment of the present invention was applied to a 2-cycle engine.

In the case of the 2-cycle engine, as is shown in FIG. 7, a preceding combustion stroke is performed from TDC, that is, 0°, an unillustrated exhaust valve is opened near a crank angle of 90° to enter an exhaust stroke, and when the cycle reaches near a crank angle of 120°, an unillustrated intake valve is opened to also enter an intake (scavenging) stroke.

Further, after BDC, the exhaust valve is closed shortly ahead of a crank angle of 230° or near this point, and the intake valve is closed shortly ahead of a crank angle 270° or near this point to enter a compression stroke. Then, the injector 28 is driven to inject fuel at a predetermined injection timing in an intake stroke or a compression stroke.

When a predetermined ignition time before TDC is reached, an unillustrated ignition circuit is driven to initiate an ignition processing (shown by a Δ mark in FIG. 7) by the spark plug 30. By this ignition processing, injected fuel is ignited to burn so that the in-cylinder pressure of the combustion chamber 27 arises. The piston 22 is therefore pushed down to produce an output.

Here, the injector 28 is controlled so that, for example, it is driven to perform injection only for a predetermined injection time PH when the engine is under a high load or in high-speed rotation but is driven to perform injection only for a predetermined injection time PL when the engine is in low-load and low-speed rotation.

This makes it possible to promote homogenization of fuel mixing and hence to ensure realization of smooth and prompt burning at the time of a high load and at the time of high rotation by starting mixing of fuel with air in the form of the reversed tumble flow TF at an early stage and also enhancing agitation of an air-fuel mixture as a result of breakage of the tumble flow in the later stage of the compression stroke.

At the time of low-load and low-speed rotation, on the other hand, the injection of fuel is delayed to await the formation of the compact combustion chamber 27A. Here, an injection of fuel is performed toward the recessed portion 22A so that the fuel is guided to and around the spark plug 30. A reversed tumble flow of a rich air-fuel mixture is therefore formed around the spark plug 30, thereby making it possible to sufficiently assure stable ignition owing to stratified combustion.

As the combustion chamber of the in-cylinder injection internal combustion engine according to the first embodiment of the present invention is constructed as described above, a flow of inducted air enters the combustion chamber 27 from each intake port 24 through its corresponding intake opening 24A in an intake stroke of the engine.

Since the injector 28 is arranged with its injection nozzle 28A facing the combustion chamber 27 and is controlled by the unillustrated controller, fuel is injected at an appropriate timing and is then mixed with air inducted corresponding to the timing of injection, whereby a stratified air-fuel mixture or a homogeneous air-fuel mixture is formed.

A vertical swirl, which has flowed in from an upper part toward a lower part of the combustion chamber 27, advances to an inner wall of the recessed portion 22A through the gently rounded portion M1 which is located on the top wall of the piston 22 and on the inlet side of the recessed portion 22A, flows along a bowed surface of the inner wall of the recessed portion 22A, and by the angular edge portion M2 at the corner portion of the tilted wall of the raised portion 22B, is allowed to effectively separate from the raised portion 22B, whereby the vertical swirl changes its direction toward the upper part of the combustion chamber 27.

In other words, the intake openings 24A are arranged on the one side of the cylinder head 21 relative to the imaginary plane 40, and the recessed portion 22A is disposed below the intake openings 24A so that they face each other. A flow of inducted air therefore flows in toward the wall of the cylinder 23A on the side of the intake openings 24A, i.e., the recessed portion 22A, is guided by the curved surface of the recessed portion 22A and further by the bowed surface of the recessed portion 22A, and becomes an upward flow directed toward the central part of the lower wall 21A of the cylinder head or its vicinity area.

Because the lower wall 21A of the cylinder head is formed in the pentroof shape, the vertical swirl of the inducted air again flows in toward the wall of the cylinder 23A on the side of the intake openings 24A and advances toward the recessed portion 22A, whereby a strong reversed tumble flow TF is formed.

Since the intake ports 24 extend in the vertical direction alongside the imaginary plane 40 on the one side of the cylinder head 21, the flow of inducted air flowing from the intake port 24 into the combustion chamber 27 is facilitated to downwardly flow in along the cylinder wall 23A on the side of the intake openings 24A and also to be introduced as a strong flow of inducted air directed to a lower part (toward the piston 22). The formation of a strong vertical swirl is therefore rendered easier.

Further, the recessed portion 22A is formed at least at the inlet side thereof for a vertical swirl into the gently rounded portion M1 and at least at the outlet side thereof for the vertical swirl into the angular edge portion M2.

As a result, the formation of the outlet side for the vertical swirl into the edge shape M2 permits easy separation of the flow of inducted air from the recessed portion 22A and inversion of the flow of inducted air along the bowed surface in the recessed portion 22A. The flowing speed is enhanced so that the reversed tumble flow can be maintained until a later stage of a compression stroke.

As a consequence, when fuel is supplied into the compact combustion chamber 27A formed in the later stage of the compression stroke, specifically into the recessed portion 22A, for example, at the time of low-load and low-speed rotation so that the fuel is allowed to flow toward the spark plug 30, the injected fuel remains as a reversed tumble flow of a relatively rich air-fuel mixture around the spark plug 30 in the recessed portion 22A while minimizing flowing of the fuel into the squishing area 22C, and a stratified reversed tumble flow is also formed by a reversed tumble flow of a superlean air-fuel mixture located apart from the spark plug 30. By performing stratified combustion, stable combustion is achieved despite it is a lean air-fuel mixture as a whole, and consequently, the gas mileage is improved.

It is therefore possible to avoid such inconvenience that the injected fuel may flow to the side of the squishing area 22C and may then be exhausted as unburned gas and accordingly, the gas mileage is lowered or the exhaust gas is deteriorated.

Owing to the formation of the outlet side for the vertical swirl into the gently rounded portion M1, heat of combustion does not act in a concentrated manner at least on the corner portion at the opening edge portion on the side of the inlet for the vertical swirl, so that no heat point is formed. Further, the formation of the corner portion into the gently rounded shape, the surface area of the top wall of the piston can be reduced. The heat loss which has remained as inconvenience to date as described above can be reduced, thereby making it possible to provide engines of higher output.

Figure 8A:
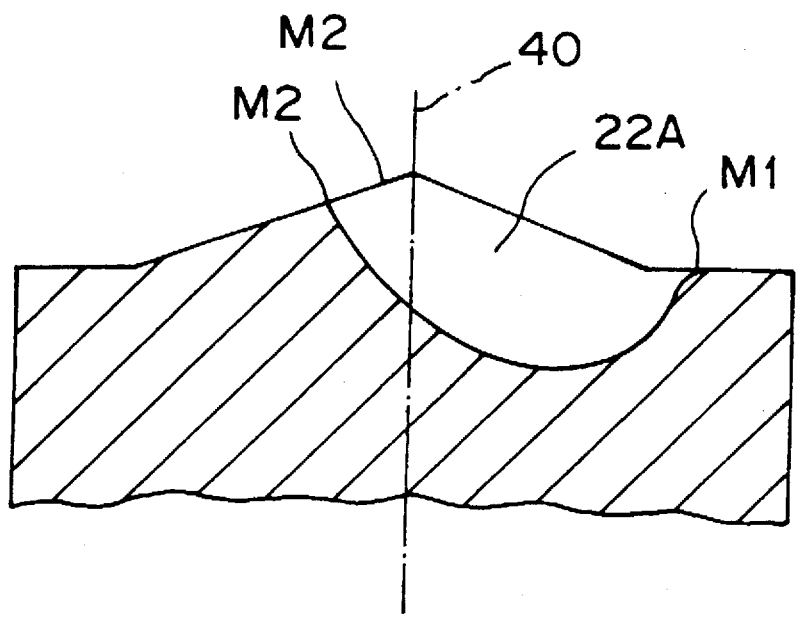
FIG. 8(A) is an enlarged cross-sectional view taken along line VIII—VIII of FIG. 3 and is a cross-sectional view showing a case in which an inlet side of a recessed portion is a rounded portion M1.
Figure 8B:
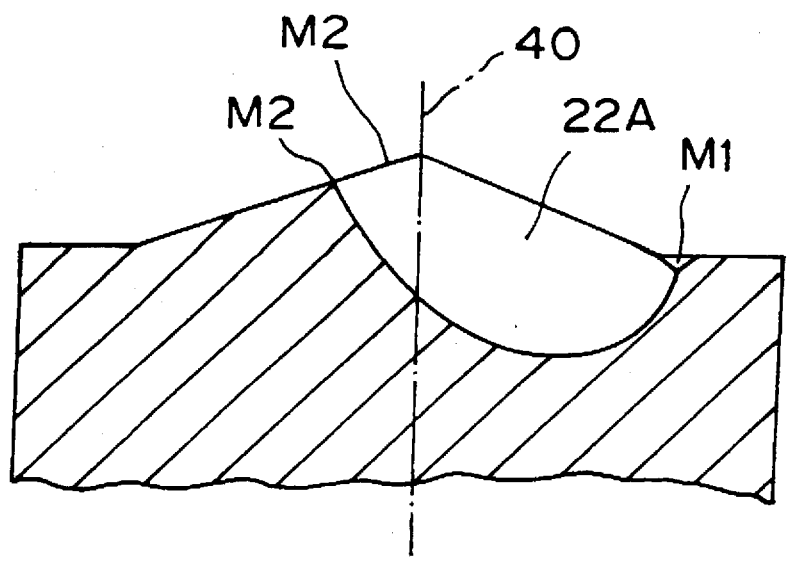
FIG. 8(B) is an enlarged cross-sectional view taken along line VIII—VIII of FIG. 3 and is a cross-sectional view showing a case in which an inlet side of a recessed portion is a chamfered portion M1.

In the above-described embodiment, the description was made about the construction that the tilted portion was formed into the gently rounded portion M1 as shown in FIG. 8(A). The tilted portion is however not limited to such a construction. Similar advantages as the above-described embodiment can still be exhibited, insofar as the corner portion on the inlet side for the vertical flow of the recessed portion 22A, said corner portion tending to become a heat point, is removed and the tilted portion is formed into such a shape as reducing the surface area of the top wall of the piston 22, for example, by cutting off and chamfering the tilted portion along a plane to form a single tilted wall as shown in FIG. 8(B), forming the tilted portion into plural tilted walls arranged in the flow-in direction of the vertical swirl, or combining the tilted wall with a rounded shape.

In the drawings of the above-described embodiment, the gently rounded portion M1 as the tilted portion was formed so that its size became gradually smaller toward opposite ends thereof at the inlet side of the peripheral edge of the recessed portion in the direction of the axis of the crankshaft of the internal combustion engine. The gently rounded portion M1 can however be formed in the same size therethroughout. In this case, similar advantages as those of the above-described embodiment can also be brought about.

Figure 9:
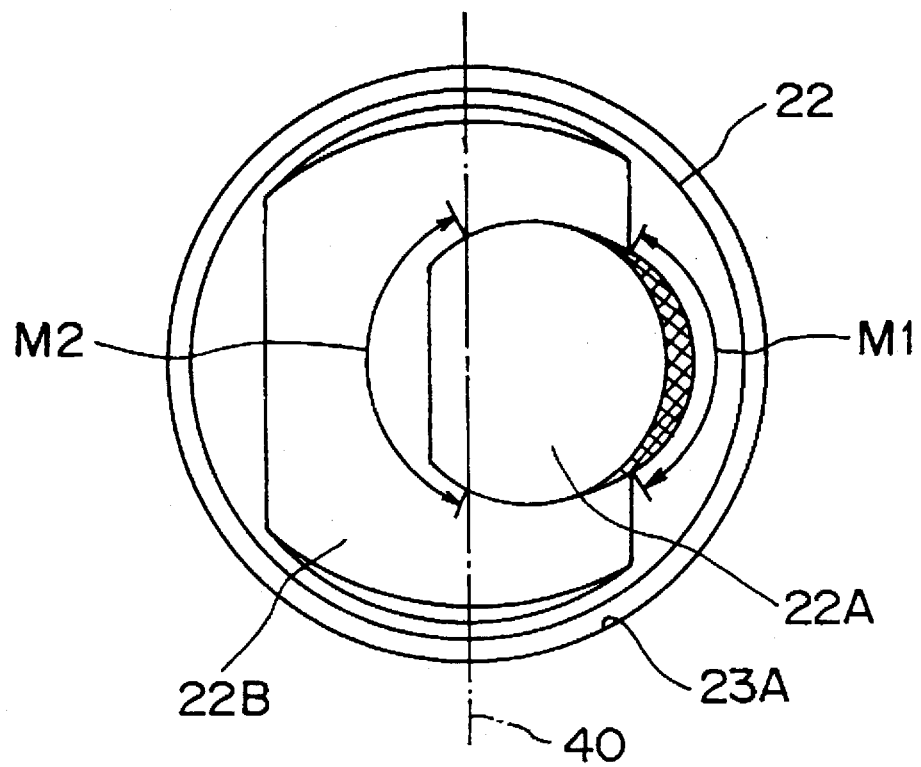
FIG. 9 is a transverse cross-sectional view corresponding to FIG. 3 and showing a structural modification of the in-cylinder injection internal combustion engine according to the first embodiment of the present invention.

FIG. 9 illustrates the modification of the construction of the recessed portion 22A in the first embodiment of the present invention. The peripheral edge is formed on the outlet side of the vertical swirl in such a shape that it extends substantially in parallel with the imaginary plane 40.

In this case, the inner wall of the recessed portion 22A is constructed as a wall with a compounded radius of curvature so that the inner wall is composed of a planar wall and a curved wall and these planer and curved walls extend in smooth continuation at a boundary therebetween.

As in the first embodiment, the corner portion of the peripheral edge of the recessed portion 22A is formed on the inlet side of the vertical swirl as a gently rounded portion M1 and on the outlet side of the vertical swirl as an edge portion M2 where the exhaust-side, tilted top wall behind the ridge of the pentroof-shaped raised portion 22B and the inner wall of the recessed portion 22A meet with each other. Accordingly, this modification exhibits similar effects as the first embodiment.

Next, the second embodiment of the present invention will be described using FIG. 10 and FIG. 11.

The second embodiment will be described by designating substantially the same parts as in the above-described first embodiment with the same reference signs.

Figure 10:
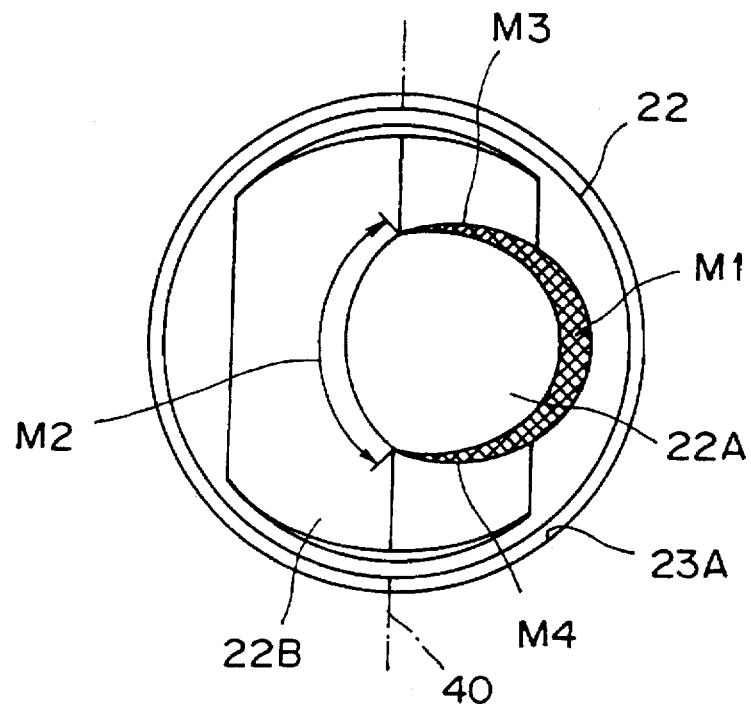
FIG. 10 corresponds to FIG. 3 and is a transverse cross-sectional view of an in-cylinder injection internal combustion engine according to a second embodiment of the present invention.

FIG. 10 is a schematic illustration showing the shape of a recessed portion on an upper part of a piston. A gently-rounded portion M1 which the recessed portion 22A is provided with is formed so that the gently-rounded portion extends at its opposite ends to an edge portion M2 on an outlet side of a vertical swirl and is provided with tapered portions M3,M4 gradually reduced in size from the rounded portion M1 toward the edge portion M2 on the outlet side of the vertical swirl.

These tapered portions M3,M4 are formed so that the size of the rounded portion gradually becomes smaller from an inlet side of the vertical swirl toward the outlet side of the vertical swirl. It is therefore possible to substantially reduce a heat point area which may occur at a corner portion of a peripheral edge of the recessed portion. A heat loss can be reduced to achieve an improvement in power output.

Further, on the outlet side of the vertical swirl, the peripheral edge of the recessed portion 22A is shaped so that the angular edge portion M2 is formed as in the first embodiment. Separating action can therefore be assured for the vertical swirl, thereby making it possible to retain a reversed tumble flow within a compact combustion chamber 27A and thus to obtain stable lean burning by stratified combustion.

Figure 11:
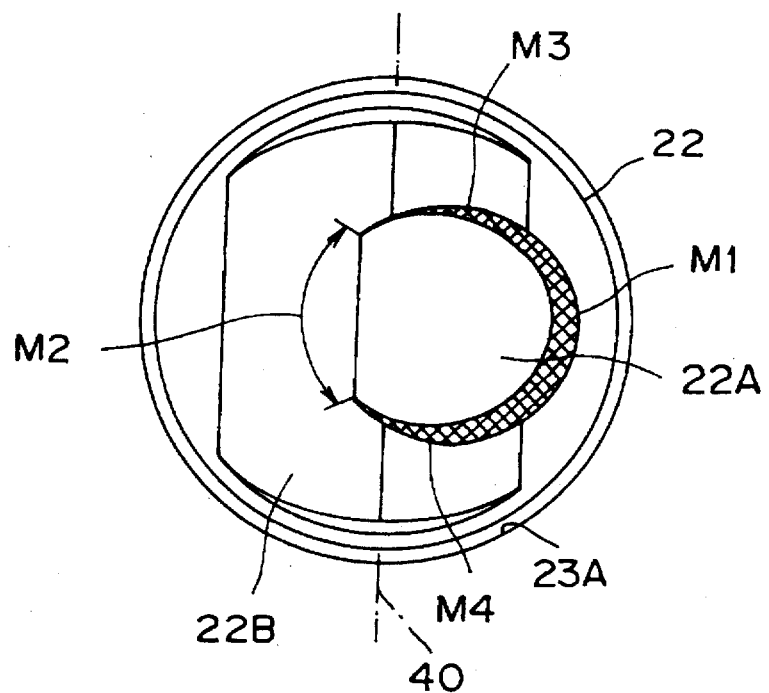
FIG. 11 is a transverse cross-sectional view corresponding to FIG. 3 and showing a structural modification of the in-cylinder injection internal combustion engine according to the second embodiment of the present invention.

FIG. 11 shows the structural modification of the recessed portion 22A in the second embodiment of the present invention. An inner wall of the recessed portion 22A is constructed as a wall with a compounded radius of curvature so that on an outlet side of a vertical swirl, the inner wall extends substantially in parallel with an imaginary plane 40. Further, an exhaust-valve-side, tilted top wall on a side of the exhaust valve opening 25A, that is, on the outlet side of the vertical swirl, is formed in the shape of an angular edge portion M2, which is substantially parallel with a ridge of a raised portion 22B, and a gently rounded portion M1 arranged on an inlet side of the vertical swirl is formed so that the gently rounded portion has tapered portions M3,M4 gradually reduced in size from the rounded portion M1 toward the opposite ends of the edge portion M2 beyond the ridge of the raised portion 22B.

Further, a corner portion of a peripheral edge of the recessed portion 22A is formed on the inlet side of the vertical swirl as the gently rounded portion M1 having the tapered portions M3,M4 gradually reduced in size toward the edge portion M2, and on the outlet side of the vertical swirl, as the angular edge portion M2 substantially parallel with the imaginary plane 40. This structural modification can therefore exhibit substantially the same effects as the second embodiment.

In the second embodiment, the description was also made, as in the first embodiment, about the construction in which the gently rounded portion M1 was formed as the oblique portion. However the second embodiment is limited to this construction, and the oblique portion can be formed as a single oblique wall or as plural oblique walls formed by successively dividing the oblique portion in the direction of entrance of the vertical swirl, or as such a shape that the corner portion of the recessed portion 22A on the inlet side of the vertical swirl, said corner portion tending to become a heat point, has been removed to reduce the surface area of the top wall of the piston 22, for example, a combination of an oblique wall and a rounded portion.

Further, as the oblique portion, the gently rounded portion M1 was formed so that its size gradually became smaller toward its opposite end portions. The gently rounded portion M1 can however be formed in the same size across the entirety thereof. In such cases, it is also possible to obtain the same effects as the second embodiment.

FIG. 12, FIG. 13(A), FIG. 13(B) and FIG. 13(C) shows the results of tests in which an internal combustion engine according to the present invention and the structures proposed in the stage of research on the present invention were compared when they were operated under such conditions as will be described hereinafter.

Figure 12:
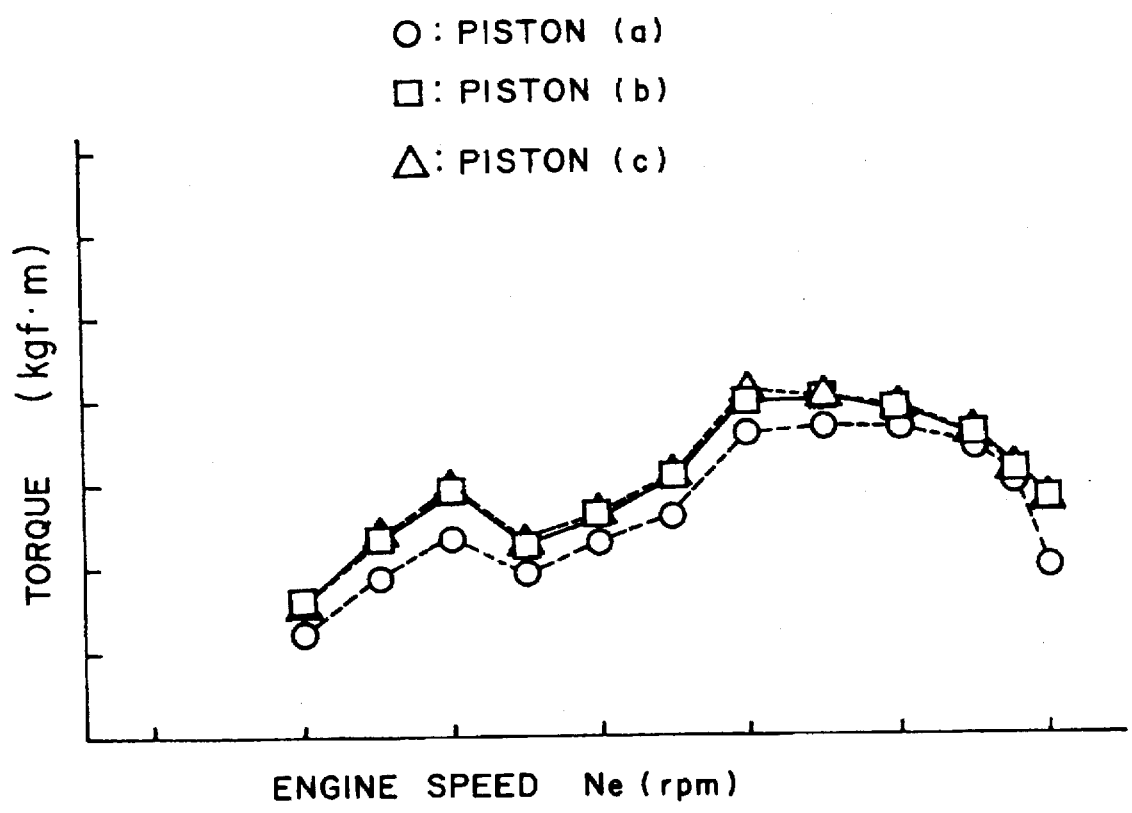
FIG. 12 is a graph showing full throttle characteristics owing to edge elimination in pistons (a), (b) and (c) as an advantage of an in-cylinder injection internal combustion engine according to the present invention.
Figure 14:
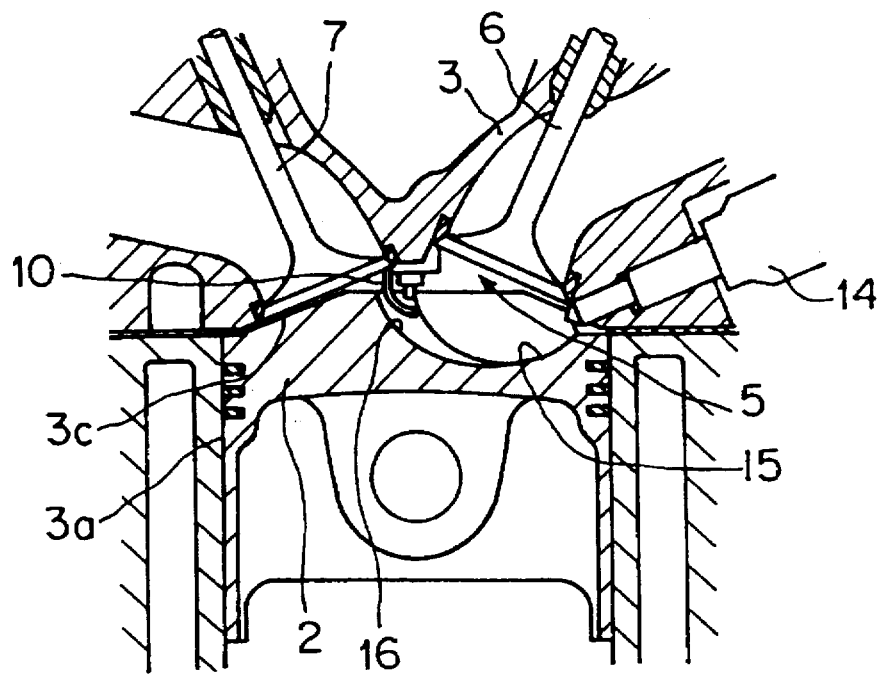
FIG. 14 is a simplified vertical cross-sectional view showing an internal construction of an in-cylinder injection internal combustion engine according to a conventional example.
Figure 15:
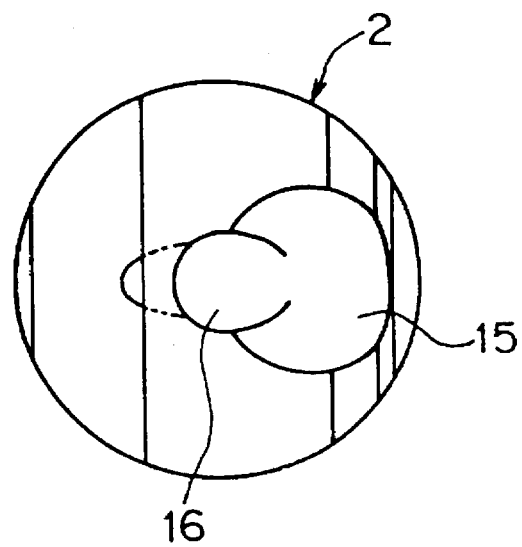
FIG. 15 is a simplified plan view showing a top wall of a piston of FIG. 14.
Figure 16:
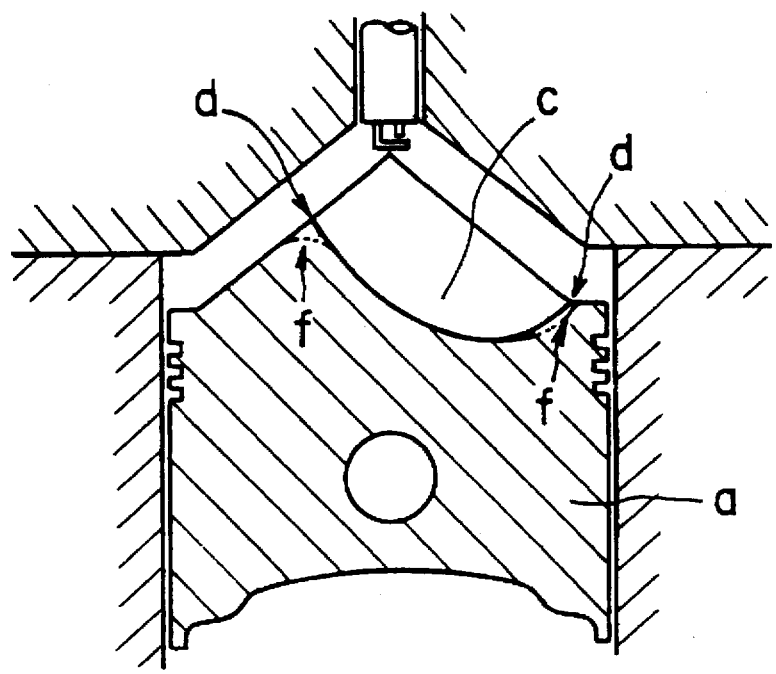
FIG. 16 is a vertical cross-sectional view schematically illustrating an interior of an in-cylinder injection internal combustion engine contemplated in a course arriving at the present invention.
Figure 17:
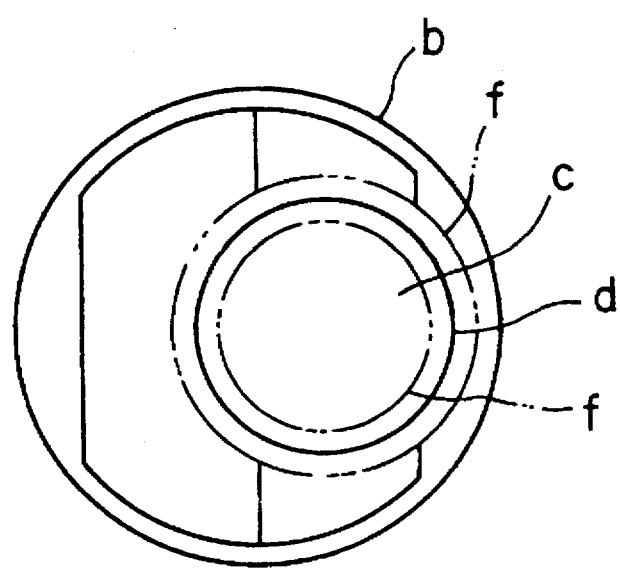
FIG. 17 is a simplified plan view showing a top wall of a piston of FIG. 16.

FIG. 12 shows full throttle characteristics owing to edge elimination, and illustrates torques when the internal combustion engines were operated under such conditions that the quantity of fuel was adjusted in response to an increase in inducted air to obtain a predetermined air-fuel ratio slightly richer than a stoichiometric air/fuel ratio with their throttle valves maintained fully opened and also that fuel injection was performed in each intake stroke.

Specifically, the □ marks in FIG. 12 correspond a piston (b), which represents a structure according to one embodiment of the present invention and has a recessed portion on a top portion of the piston. The recessed portion is provided with the gently rounded portion M1 on the inlet side of the vertical swirl, the tapered portions M3,M4 extending along the vertical swirl between the inlet side and the outlet side and gradually reduced in size, and the edge portion M2 on the outlet side of the vertical swirl.

The ○ marks in FIG. 12 correspond to a piston (a), which has the all-around edge along the peripheral edge of the opening of the recessed portion on the top portion of the piston.

On the other hand, the △ marks in FIG. 12 correspond to a piston (c), in which the edge of the peripheral edge of the opening of the recessed portion on the top portion of the piston has been cut off into a round shape along the entire periphery.

From the above test results, it is understood that during such a high-load time as injecting fuel in each intake stroke, the pistons (b), (c) having the rounded shapes at the corners of the recessed portions provide substantially the same torque and are improved in torque over the piston (a), which has the edge at the corner of the recessed portion, substantially over the entire rotation range from low rotation to high rotation.

Namely, it is understood that at the time of high load, output-torque improving effects equivalent to those available from the piston whose peripheral edge has been cut off into the rounded portion along the entire periphery thereof can be obtained even from the piston of this invention with the edge portion M2 formed on the outlet side of the vertical swirl.

FIG. 13(A) illustrates gas mileage characteristics upon injection in each compression stroke and depicts test results of the piston (a), FIG. 13(B) shows test results of the piston (b) according to the one embodiment of the present invention, and FIG. 13(C) represents test results of the piston (c).

Each of these diagrams shows variations in gas mileage and misfire zones (operation zones in which a misfire takes place) when the internal combustion engine was operated under conditions such that the quantity of fuel to be supplied to the internal combustion engine was fixed, the air/fuel ratio was varied by increasing or decreasing the throttle valve opening (the quantity of air to be supplied) stepwise in a range where an air-fuel mixture lean as a whole is formed, the timing of fuel injection was changed at individual air/fuel ratios, and fuel injection was performed in a later stage of each compression stroke.

From the test results, it is appreciated that at the time of such low-load and low-speed rotation as injecting fuel in a later stage of each compression stroke, the pistons (a),(b) having an edge portion at least on a vertical swirl outlet side of a recessed portion can provide substantially the same gas mileage and, compared with a piston (c) having a rounded portion over the entire periphery of a rounded portion including the outlet side of the vertical swirl, are improved in gas mileage over the entire test conditions and have a smaller misfire range (is more resistant to a misfire even when operation conditions vary).

In other words, it is understood that at the time of low-load and low-speed rotation, a piston having the edge portion M2 on an outlet side of a vertical swirl as in the present invention permits good separation of a reversed tumble flow, maintains the reversed tumble flow in a compact combustion chamber, prevents fuel from flowing out to a squished area and hence provides a gas mileage substantially equal to that available from a piston having an all-around edge along the periphery of an opening of a recessed portion. By the way, concerning the misfire zone, the piston (b) has a slightly broader misfire zone than the piston (a).

From the above test results of FIG. 12, FIG. 13(A), FIG. 13(B) and FIG. 13(C), the piston construction according to the present invention makes it possible to facilitate the separation of a vertical swirl upon stratified combustion of an air-fuel mixture, which is lean as a whole, so that the air-fuel mixture is allowed to burn in a stable state and an improvement is achieved in gas mileage. At the same time, it also makes it possible to avoid a heat loss and hence to achieve an improvement in power output even when an air-fuel mixture (an air-fuel mixture equivalent to a stoichiometric air-fuel ratio) richer than that used upon lean burning is caused to burn.

In each of the embodiments, the description was made about the case that a flow of inducted air from the intake passage 24 flows from the cylinder wall on one side of the imaginary plane 40 toward the cylinder wall on an opposite side while being reversed by the recessed portion 22A on the top portion of the piston, that is, a so-called reversed tumble flow is formed. However, the same effects as those available from both the above embodiments can also be obtained when the present invention is applied to a so-called normal tumble flow that the flow of inducted air flows in at an angle relative to the cylinder axis, advances from the one side of the imaginary plane 40, flows along the lower wall of the cylinder head 21 on the opposite side, and flows from the cylinder wall on the opposite side toward the cylinder wall on the one side while being reversed on the recessed portion 22A on the top portion of the piston.

In other words, the same effects as those available from both the above embodiments can also be obtained when the present invention is applied to a recessed portion in a top wall of a piston that a flow of inducted air—which was introduced into a combustion chamber through an intake port and has then flowed in along a cylinder axis—is reversed by the recessed portion in the top wall of the piston into a vertical swirl flowing upwards along the cylinder axis.

The embodiments were each described by applying the present invention to the 4-valve internal combustion engine equipped with the two intake valves and the two exhaust valves. The present invention is however not limited to 4-valve internal combustion engines but can also be applied, for example, to 3-valve internal combustion engines having 2 intake valves and 1 exhaust valve and various other internal combustion engines.

Capability of Exploitation in Industry

As has been described above, in an in-cylinder injection internal combustion engine according to the present invention, a recessed portion is formed in a top wall of a piston to promote formation of a vertical swirl so that a flow of inducted air introduced into a combustion chamber of the engine is caused to advance from a lower wall of a cylinder head toward the top wall of the piston and then to advance backward from the top wall of the piston toward the lower wall of the cylinder head. A corner of the recessed portion is formed blunter at an inlet side of the vertical swirl than at an outlet side of the vertical swirl, whereby the strong vertical swirl is formed in the combustion chamber. The engine can therefore be operated stably even by lean burning of a stratified tumble flow composed of a rich air-fuel mixture and a superlean air-fuel mixture, thereby achieving an improvement in gas mileage. Further, when an air-fuel mixture richer than that used upon lean burning is caused to burn, a heat loss can also be reduced. The present invention can therefore significantly contribute to improvements in the efficiency and power output of an internal combustion engine.

We claim:

1. An in-cylinder injection internal combustion engine provided with:
    a combustion chamber (27) formed by a cylinder head lower wall (21A) and a top wall of a piston fittedly inserted within a cylinder,
    an intake valve arranged in said cylinder head lower wall (21A) of said combustion chamber (27),
    an exhaust valve arranged in said cylinder head lower wall (21A) of said combustion chamber (27),
    an intake port (24) communicating at a lower end thereof to said combustion chamber (27) through said intake valve so that a longitudinal swirl of inducted air is formed within said combustion chamber (27),
    an exhaust port (25) communicating at a lower end thereof to said combustion chamber (27) through said exhaust valve so that combustion gas in said combustion chamber (27) is exhausted,
    a spark plug (30) arranged on said cylinder head lower wall (21A) of said combustion chamber (27), and
    fuel injection means (H) for directly injecting fuel into said combustion chamber (27), characterized in that:
        said piston (22) has a recessed portion (22A) arranged in said top wall of said piston (22) to promote the formation of said longitudinal swirl with inducted air introduced into said combustion chamber (27) through said intake valve, and
        a peripheral edge of said recessed portion is formed blunter at a corner portion (M1) on an inlet side of said vertical swirl than at another corner portion (M2) on an outlet side of said vertical swirl.

2. An in-cylinder injection internal combustion engine according to claim 1, wherein said peripheral edge of said recessed portion is formed, at said inlet side of said vertical swirl, as such an oblique portion that said corner portion (M1) formed by said top wall of said piston (22) and an inner wall of said recessed portion (22A) is inclined from said top wall of said piston (22) toward said recessed portion (22A).

3. An in-cylinder injection internal combustion engine according to claim 2, wherein said oblique portion (M1) is formed in a shape gently rounded from a side of said top wall of said piston toward a side of said inner wall of said recessed portion (22A).

4. An in-cylinder injection internal combustion engine according to claim 2, wherein said oblique portion (M1) is formed as an oblique surface linearly inclined from a side of said top wall of said piston (22) toward a side of said inner wall of said recessed portion (22A).

5. An in-cylinder injection internal combustion engine according to claim 2, wherein said oblique portion (M1) is formed so that said inlet-side peripheral edge of said recessed portion extends, at opposite end portions thereof in a direction of an axis of a crankshaft of said internal combustion engine, toward said outlet side of said vertical swirl.

6. An in-cylinder injection internal combustion engine according to any one of claim 2 to claim 5, wherein said oblique portion (M1) is formed so that said oblique portion is gradually reduced in size from an inlet-side central part of said peripheral edge of said recessed portion toward said opposite end portions.

7. An in-cylinder injection internal combustion engine according to claim 1, wherein said peripheral edge of said recessed portion is formed on said outlet side of said vertical swirl so that said corner portion formed by said top wall of said piston (22) and an inner wall of said recessed portion (22A) is in the form of an edge portion (M2).

8. An in-cylinder injection internal combustion engine according to claim 7, wherein said outlet-side corner portion of said recessed portion is formed as an angular edge portion (M2).

9. An in-cylinder injection internal combustion engine according to claim 7, wherein said peripheral edge of said recessed portion is formed, on said outlet side of said vertical swirl, substantially in parallel with an imaginary plane (40) in which an axis of a crankshaft and an axis of said cylinder of said internal combustion engine are contained.

10. An in-cylinder injection internal combustion engine according to claim 1, wherein said intake valve is arranged on one side of said combustion chamber (27), and said recessed portion (22A) is arranged deviated from a center of said top wall of said piston (22) toward said one side so that said recessed portion is located facing at least said intake valve.

11. An in-cylinder injection internal combustion engine according to claim 10, wherein said recessed portion (22A) is formed so that a cross-sectional shape taken in a flowing direction of said vertical swirl is in the shape of an arc of circle.

12. An in-cylinder injection internal combustion engine according to claim 10, wherein said recessed portion (22A) is formed in the shape of a spherical surface.

13. An in-cylinder injection internal combustion engine according to claim 1, wherein said cylinder head lower wall (21A) is formed in the shape of a pentroof composed of an intake-valve-side, tilted lower wall formed on said one side and an exhaust-valve-side, tilted lower wall formed on said opposite side, and said top wall of said piston (22) is formed in the shape of said pentroof having an intake-valve-side, tilted top wall and an exhaust-valve-side, tilted top wall formed corresponding to said intake-valve-side, tilted lower wall and said exhaust-valve-side, tilted lower wall, respectively.

14. An in-cylinder injection internal combustion engine according to claim 13, wherein said recessed portion (22A) is formed in said intake-valve-side, tilted top wall, and said recessed portion (22A) is also formed higher on said outlet side of said vertical swirl than on said inlet side of said vertical swirl.

15. An in-cylinder injection internal combustion engine according to claim 13, wherein said recessed portion (22A) is formed extending over said intake-valve-side, tilted top wall and said exhaust-valve-side, tilted top wall.

16. An in-cylinder injection internal combustion engine according to claim 15, wherein said corner portion formed by said exhaust-valve-side, tilted top wall and an inner wall of said recessed portion (22A) is formed in the shape of an edge portion (M2) as said peripheral edge of said recessed portion at the outlet side of said vertical swirl.

17. An in-cylinder injection internal combustion engine according to claim 1, wherein said intake port (24) is arranged on one side of said imaginary plane (40) and extends vertically alongside said imaginary plane (40) through said cylinder head (21).

* * * * *

UNITED STATES PATENT AND TRADEMARK OFFICE
CERTIFICATE OF CORRECTION

PATENT NO. : 5,711,269
DATED : January 27, 1998
INVENTOR(S) : H. Oda, et al

It is certified that error appears in the above-indentified patent and that said Letters Patent is hereby corrected as shown below:

[57] Abstract:

Line 10, change "outlet" to --inlet--;

Line 11, change "inlet" to --outlet--;

In Col. 11, line 10, change "outlet" to --inlet--.

Signed and Sealed this

Eighteenth Day of August, 1998

Attest:

BRUCE LEHMAN

Attesting Officer

Commissioner of Patents and Trademarks